United States Patent
Lee et al.

(10) Patent No.: US 11,709,261 B2
(45) Date of Patent: Jul. 25, 2023

(54) RADAR DEVICE FOR VEHICLE, CONTROLLING METHOD OF RADAR DEVICE AND RADAR SYSTEM FOR VEHICLE

(71) Applicant: MANDO CORPORATION, Pyeongtaek-si (KR)

(72) Inventors: Jingu Lee, Ansan-si (KR); Han Byul Lee, Seoul (KR)

(73) Assignee: HL Klemove Corp., Incheon (KR)

( * ) Notice: Subject to any disclaimer, the term of this patent is extended or adjusted under 35 U.S.C. 154(b) by 175 days.

(21) Appl. No.: 17/314,123

(22) Filed: May 7, 2021

(65) Prior Publication Data

US 2021/0349209 A1    Nov. 11, 2021

(30) Foreign Application Priority Data

May 8, 2020    (KR) .......................... 10-2020-0055149

(51) Int. Cl.
 *G01S 13/931*    (2020.01)
 *G01S 13/42*     (2006.01)
 *G01S 13/50*     (2006.01)

(52) U.S. Cl.
 CPC .......... *G01S 13/931* (2013.01); *G01S 13/426* (2013.01); *G01S 13/505* (2013.01); *G01S 2013/932* (2020.01); *G01S 2013/9316* (2020.01); *G01S 2013/9318* (2020.01); *G01S 2013/9319* (2020.01); *G01S 2013/93271* (2020.01)

(58) Field of Classification Search
 CPC .... G01S 13/931; G01S 13/426; G01S 13/505; G01S 2013/932; G01S 2013/9318; G01S 2013/9316; G01S 2013/93271; G01S 2013/9319
 USPC .......................................................... 342/70
 See application file for complete search history.

(56) References Cited

U.S. PATENT DOCUMENTS

| 10,996,319 B2 * | 5/2021 | Yamasaki ............... G01S 17/10 |
| 11,348,380 B2 * | 5/2022 | Fang ..................... G07C 5/008 |

(Continued)

FOREIGN PATENT DOCUMENTS

| CN | 206602167 U | * 10/2017 | ........... G01S 13/345 |
| CN | 207490082 U | * 6/2018  | ........... G01S 13/345 |

(Continued)

*Primary Examiner* — Nuzhat Pervin
(74) *Attorney, Agent, or Firm* — Morgan, Lewis & Bockius LLP

(57) ABSTRACT

The present disclosure relates to a vehicle radar device, a controlling method thereof, and radar system. A radar device according to an embodiment includes a transceiver being controlled to transmit the transmission signal in an operating frequency band according to a selection mode among a plurality of frequency band modes and to receive the reception signal through the receiving antenna, and a mode selector dynamically determining one of the plurality of frequency band modes as the selection mode based on at least one of a target distance to the target and a maximum detection distance for each frequency band. According to embodiments of the present disclosure, the distance resolution of the radar can be optimized by dynamically varying the frequency bandwidth linked with the maximum detection distance according to a target distance under specific driving conditions.

15 Claims, 13 Drawing Sheets

(56) References Cited

U.S. PATENT DOCUMENTS

| | | | | |
|---|---|---|---|---|
| 2006/0132354 A1* | 6/2006 | Beard | ............... | G01S 13/5246 342/91 |
| 2006/0262007 A1* | 11/2006 | Bonthron | ............... | G01S 13/44 342/107 |
| 2007/0109175 A1* | 5/2007 | Fukuda | ............... | G01S 7/36 342/134 |
| 2009/0278727 A1* | 11/2009 | Inaba | ............... | G01S 7/0235 342/112 |
| 2014/0350836 A1* | 11/2014 | Stettner | ............... | G01S 7/481 356/4.01 |
| 2015/0168546 A1* | 6/2015 | Nakagawa | ............... | G01S 13/0209 342/21 |
| 2016/0003946 A1* | 1/2016 | Gilliland | ............... | G01S 17/894 356/5.01 |
| 2016/0313445 A1* | 10/2016 | Bailey | ............... | G01S 17/36 |
| 2017/0059695 A1* | 3/2017 | Fetterman | ............... | G01S 13/726 |
| 2017/0153315 A1* | 6/2017 | Katayama | ............... | G01S 13/931 |
| 2018/0356507 A1* | 12/2018 | Ichinose | ............... | B64C 1/36 |
| 2019/0056476 A1* | 2/2019 | Lin | ............... | G01S 7/023 |
| 2019/0170871 A1* | 6/2019 | Henderson | ............... | G01S 13/584 |
| 2019/0195985 A1* | 6/2019 | Lin | ............... | G01S 13/931 |
| 2019/0285743 A1* | 9/2019 | Kaino | ............... | G01S 13/424 |
| 2019/0317187 A1* | 10/2019 | Meissner | ............... | G01S 13/34 |
| 2019/0377077 A1* | 12/2019 | Kitayama | ............... | G01S 13/931 |
| 2019/0378356 A1* | 12/2019 | Fang | ............... | G07C 5/008 |
| 2021/0124011 A1* | 4/2021 | Madhow | ............... | G01S 13/86 |
| 2021/0255275 A1* | 8/2021 | Gao | ............... | H04W 72/0453 |

FOREIGN PATENT DOCUMENTS

| | | | | |
|---|---|---|---|---|
| DE | 102015202628 A1 * | 8/2015 | ............ | B60W 30/08 |
| EP | 2977784 A1 * | 1/2016 | ............ | G01S 13/0209 |
| WO | WO-2007014333 A2 * | 2/2007 | ............ | G01S 13/34 |
| WO | WO-2020017475 A1 * | 1/2020 | ............ | G01S 13/34 |
| WO | WO-2020082985 A1 * | 4/2020 | ............ | G01S 13/347 |

* cited by examiner

FIG. 8

| Mode | BW(Bandwidth) | Δr (Identification Distance Difference) | $r_{max}$ (Maximum Detection Distance) |
|---|---|---|---|
| 1 | $BW_1$ MHz | $\Delta r_1$ | $r_{1,max}$ |
| 2 | $BW_2$ MHz | $\Delta r_2$ | $r_{2,max}$ |
| 3 | $BW_3$ MHz | $\Delta r_3$ | $r_{3,max}$ |
| ... | | | |
| N | $BW_N$ MHz | $\Delta r_N$ | $r_{N,max}$ |

$BW_1 > BW_2 \cdots > BW_N$

RADAR DEVICE FOR VEHICLE, CONTROLLING METHOD OF RADAR DEVICE AND RADAR SYSTEM FOR VEHICLE

CROSS REFERENCE TO RELATED APPLICATION

This application claims priority from Korean Patent Application No. 10-2020-0055149, filed on May 8, 2020, which is hereby incorporated by reference for all purposes as if fully set forth herein.

TECHNICAL FIELD

An embodiment of the present disclosure relates to a radar device for a vehicle, a controlling method of the radar device, and a radar system for a vehicle. More specifically, the embodiment of the present disclosure relates to a radar device which dynamically changes the operating frequency band of the radar signal according to the distance to a target or the maximum detection distance in order to improve the detection performance of horizontal information in the multiple reception path environment of radar signals.

BACKGROUND

A radar device mounted in a vehicle or the like is widely used as a sensor device for vehicle control. The radar device may transmit electromagnetic waves having a predetermined frequency, receive a signal reflected from an object, and process the reception signal so as to extract the position of the object, speed information, or the like.

The target information acquired by the vehicle radar may include location information including distance information and angle information, and relative speed information between the host vehicle and the target.

In the case that, the distance, speed, and space (angle) information, which are three domains constituting the target information, are independently obtained for each target, contamination of signal components between multiple targets does not occur.

However, if a vehicle travels on a road with guardrails, sound barriers, tunnels, etc., a situation in which radar signals are transmitted and received through multiple paths may occur due to such a stationary structure.

In such a multiple reception path environment, multiple signals may overlap, so that target information, particularly horizontal angle information or horizontal position information, may be inaccurate.

Specifically, a single target may be recognized as two targets (real target and ghost) present in several lateral positions.

In addition, it may be recognized indefinitely whether a target is a single target or multiple targets on the range-velocity domain.

In order to solve such a problem, it is required to improve the distance resolution. Accordingly, the number of antennas of the radar device may be increased by hardware, the antenna separation distance may be adjusted, or the frequency bandwidth of the radar signal may be increased.

However, due to an increase in cost and space problems, there may be certain limitations in the hardware solution of the radar device.

In addition, if the frequency bandwidth is increased, the distance resolution is improved, however, there is a disadvantage in that the maximum detection distance may be decreased.

Accordingly, there is a need for a method capable of securing the lateral position detection performance of the target without reducing other performance of the radar device under a specific condition such as a multiple reception path environment.

SUMMARY

In this background, embodiments of the present disclosure provide a method for improving a horizontal detection performance of a radar device.

Embodiments of the present disclosure provide a vehicle radar device, a controlling method thereof and a radar system capable of accurately acquiring lateral position information of a target in a multiple reception path environment, and so on.

Embodiments of the present disclosure provide a vehicle radar device, a controlling method thereof and a radar system capable of dynamically optimizing a distance resolution of a radar by dynamically varying the frequency bandwidth linked to the maximum detection distance according to the distance or range of the target under specific driving conditions.

Embodiments of the present disclosure provide a vehicle radar device and a controlling method thereof and a radar system capable of, if specific driving conditions are satisfied, dynamically changing the horizontal detection performance of the radar by dynamically converting to one of a number of frequency band modes based on the detected distance of the target.

In accordance with an aspect of the present disclosure, there is provided a radar device for a vehicle including an antenna unit including a transmission antenna for transmitting a transmission signal around the vehicle and a receiving antenna for receiving a reception signal reflected from a target, a transceiver being controlled to transmit the transmission signal in an operating frequency band according to a selection mode among a plurality of frequency band modes through the transmission antenna, and to receive the reception signal through the receiving antenna, a signal processor processing the reception signal received from the receiving antenna to acquire target information, and a mode selector dynamically determining one of the plurality of frequency band modes as the selection mode based on at least one of a target distance to the target acquired from the signal processor and a maximum detection distance for each frequency band.

In addition, the a radar device for a vehicle according to an embodiment may further include a condition determiner determining a driving condition of the vehicle based on obtained information on a stationary obstacles around the vehicle, and activating the mode selector if the driving condition of the vehicle corresponds to a specific driving condition.

In this case, the specific driving condition may include a condition in which at least one of the guardrails, soundproof walls, tunnels, and overpasses exist around the vehicle.

Information on the obstacle around the vehicle may be acquired from target information obtained from the signal processor or from other sensor information obtained from an additional vehicle detection sensor.

In addition, each frequency band mode included in the plurality of frequency band modes may be defined by a unique operating frequency band and the maximum detection distance corresponding thereto, and the mode selector may determine, as the selection mode, a frequency band mode having the largest operating frequency band among one or more frequency band modes which have the maximum detection distance greater than the target distance.

The signal processor may perform a first fourier transform (1st FFT) on the reception signal for a fast time to obtain a time component according to a distance, and perform a second fourier transform (2nd FFT) for a slow time and compress a signal existing at each distance according to a velocity to calculate a range-velocity information of the target.

Further, the signal processor may determine whether the target is a single target or a multiple target based on the range-velocity information calculated according to the selection mode.

A distance resolution of an object at the target distance is maximized according to the operating frequency band of the selection mode determined by the mode selector.

In accordance with an aspect of the present disclosure, there is provided a controlling method of a vehicle radar device. The controlling method of the vehicle radar device may include transmitting a transmission signal in an operating frequency band according to a selection mode among a plurality of frequency band modes through a transmission antenna and receiving a reception signal reflected from an object by a receiving antenna, processing the reception signal received from the receiving antenna to acquire a target information, dynamically determining the selection mode from one of the plurality of frequency band modes as based on at least one of a target distance to a target acquired in the processing the reception signal and a maximum detection distance for each frequency band, and transmitting the transmission signal in the operating frequency band corresponding to the selection mode during a subsequent scan operation.

In accordance with another aspect of the present disclosure, there is provided a radar system for a vehicle. The radar system for a vehicle may include a transmission antenna for transmitting a transmission signal in an operating frequency band according to a selection mode among a plurality of frequency band modes, a receiving antenna for receiving a reception signal reflected from a target, and a signal processing device that processes the reception signal received from the receiving antenna to acquire a target information, and dynamically determines the selection mode from one of the plurality of frequency band modes as based on at least one of a target distance to a target acquired in the processing the reception signal and a maximum detection distance for each frequency band, and transmits the transmission signal in an operating frequency band corresponding to the selection mode during a subsequent scan operation.

According to an embodiment of the present disclosure, it is possible to improve a horizontal detection performance of a radar device.

In addition, according to an embodiment, it is possible to precisely acquire the lateral position information of the target in a multiple reception path environment.

In addition, it is possible to dynamically optimize the distance resolution of the radar by dynamically varying the frequency bandwidth linked with the maximum detection distance according to the target distance of the target under specific driving conditions.

In addition, according to an embodiment of the present disclosure, if a specific driving condition is satisfied, the horizontal detection performance of the radar device can be dynamically changed by dynamically converting to one of a plurality of frequency band modes based on the detected target distance of the target.

BRIEF DESCRIPTION OF THE DRAWINGS

FIG. 8 illustrates an example of a plurality of frequency band mode setting information according to an embodiment of the present disclosure.

DETAILED DESCRIPTION

Figure 1:
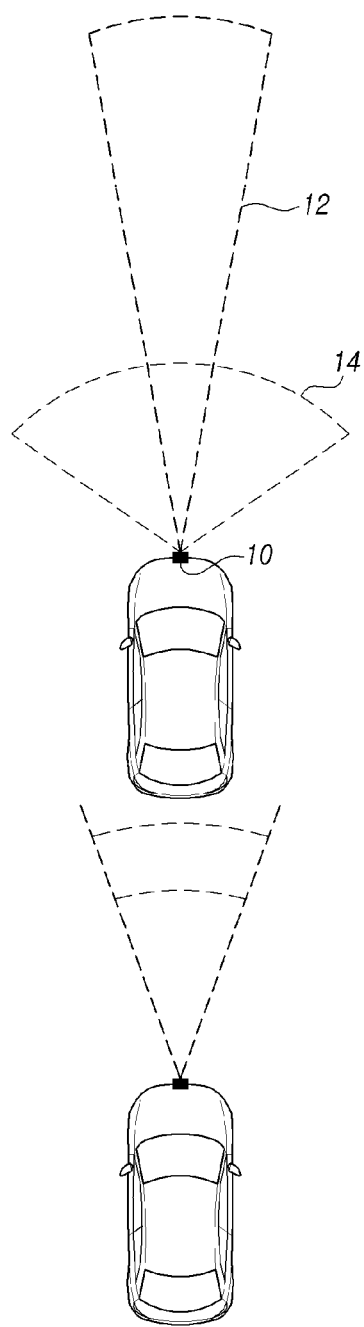
FIG. 1 illustrates an object detection method of a general vehicle radar sensor, and illustrates a medium/long-range detection area and a short-range detection area.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element.

FIG. 1 illustrates an object detection method of a general vehicle radar sensor, and illustrates a medium/long-range detection area and a short-range detection area.

As shown in FIG. 1, the vehicle radar sensor is required to have both a medium/long-range detection function for detecting a long-range target in front and a short-range detection function for detecting a short-range target near the vehicle when detecting an object in the vicinity of the vehicle.

In vehicles using radar sensors, various types of driver assistance systems (DAS) may be used to assist the driver's driving.

In an adaptive cruise system (ACC) for following the preceding vehicle, it is necessary to detect a mid-to-long-range target in front of the vehicle traveling direction.

Meanwhile, in the automatic emergency braking system (AEB) or an automatic emergency steering system (AES) that for urgently braking or steering the vehicle when there is an obstacle in front, or in the lane changing assistance (LCA) system for preventing collisions with obstacles in adjacent lanes when changing lanes, it is necessary to detect near-field obstacles near the vehicle with high precision.

That is, the vehicle radar device is required to measure target information such as distance, speed, and angle information of various targets in a wide range with high precision.

In particular, in a general two-dimensional road driving environment, it is necessary to accurately measure the lateral position information of the target including the distance and the horizontal angle of the target rather than vertical information.

To this end, as shown in the upper drawing of FIG. 1, the vehicle radar device 10 may have a long-range detection area 12 having a relatively narrow detection angle and a long detection distance for mid-to-long-range sensing, and a wide sensing angle and a short-range detection area 14 having a wide detection angle and a small detection distance.

Such a radar device for a vehicle may be required to transmit the transmission signal in a mid-to-long-range transmission beam pattern for mid-to-long-range detection, and to transmit the transmission signal in a short-range transmission beam pattern different from a medium-to-long range transmission beam pattern for short-range detection.

However, since such a radar device is required to include an antenna structure and a signal processing unit of two modes according to the detection range, the structure of the radar device may be complicated, and a load of the signal processing operation may increase.

In order to solve this problem, it is necessary to integrate medium/long-range radar and short-range radar in vehicle radar. In addition, in order to integrate medium/long-range radar and short-range radar, it may be considered the manner using transmission antenna for each mode and common receiving antenna.

That is, as shown in the lower figure of FIG. 1, a radar device having a single detection area is provided, however, by implementing different horizontal information distance resolutions according to the distance of the target, it is possible to provide a radar device with a simple structure and the improved accuracy of the target horizontal information.

In addition, the vehicle radar may provide vertical direction information such as an elevation angle of an object in addition to the distance, speed, and horizontal angle of the target.

In order to estimate the elevation angle, the power of target signals received from different transmission/receiving antennas may be used, or an array antenna in a vertical direction may be used.

The elevation angle estimated as described above may be used for classification of the target.

Figure 2:
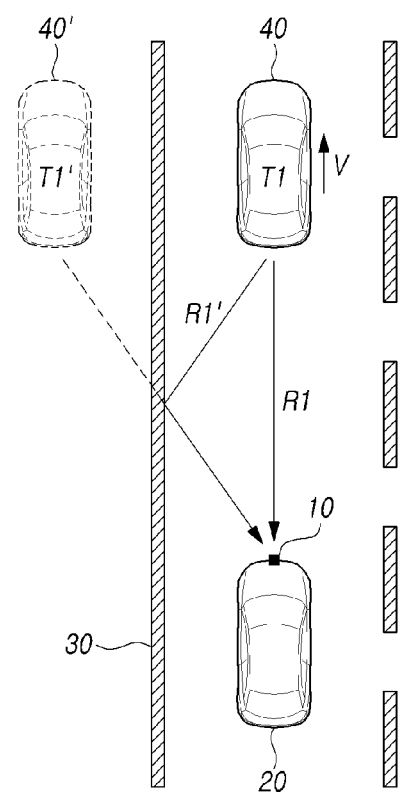
FIG. 2 illustrates an example of a multiple reception path environment in which the detection performance of a radar device may be reduced.

FIG. 2 illustrates an example of a multiple reception path environment in which the detection performance of a radar device may be reduced.

If a vehicle is travelling on a normal road without surrounding obstacles, the transmitted radar signal is reflected only on the target.

Accordingly, only the primary reception signal component by the target exists in the reception signal, and in this case, target information such as distance, speed, and angle (space) may be uniquely determined.

However, if there is a stationary obstacle such as a guard drain, a soundproof wall, a tunnel, an overpass, etc. in the front or side of the travelling vehicle, the radar signal may include components for one or more paths as a transmission path of a transmission signal arriving at the target or a reception path of a reflection signal reflected from the target.

More specifically, FIG. 2 illustrates the environment in which there is a stationary obstacle 30 of a soundproof wall or guardrail longitudinally extending in the road direction on the left side of the road on which a vehicle 20 mounting a front radar device 10 travels.

In this case, the reception signal reflected from the target, which is the other vehicle 40 in front, may be received by the radar through the first reception path R1, and, may be simultaneously received by being secondly reflected from the stationary obstacle 30 through a second reception path R2.

In this way, an environment in which two or more transmission and reception paths of a radar signal are formed between a radar device and a target may be referred as a multiple reception path state.

In such a multiple reception path environment, in addition to the real target which is an actual other vehicle 40, there may be a ghost 40' being detected beyond the stationary obstacle 30 as indicated by the dotted line.

That is, the distance-speed information or the range-velocity information of one real target may be recognized as having various values, and the real target may be expressed as an unclear detection region in the range-velocity domain as described below.

Therefore, there is a problem that the distance information of the target is inaccurately acquired.

This phenomenon may be more likely to occur in the case that a stationary obstacle 30 includes has longitudinal stationary obstacles such as guardrails, soundproof walls, etc., which are longitudinally arranged in the extending direction of the road, and may also occur when there are other steel tunnels, etc.

Figure 3:
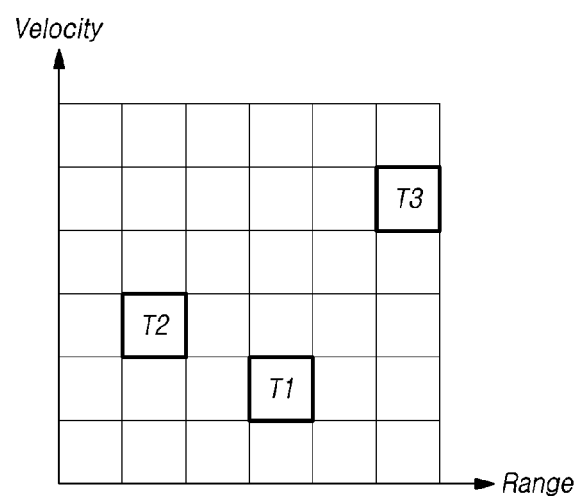
FIG. 3 illustrates target information of the case in which multiple targets are detected in a normal environment.
Figure 4:
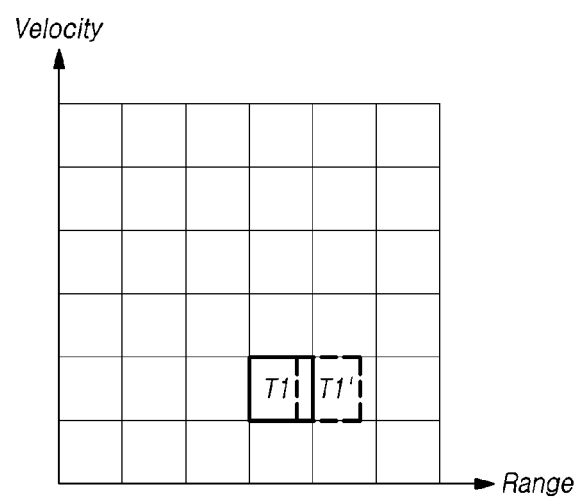
FIG. 4 illustrates an example of target information in the case that a target is inaccurately detected in a multiple reception path environment.

FIG. 3 illustrates target information of the case in which multiple targets are detected in a normal environment, and FIG. 4 illustrates an example of target information in the case that a target is inaccurately detected in a multiple reception path environment.

FIG. 3 and FIG. 4 illustrate the target information in a two-dimensional domain of range-velocity information or distance-speed information.

Referring to FIG. 3, in a normal environment where multiple reception paths do not occur, targets 1, 2 and 3 (T1, T2, T3) are recognized as being distinguished from each other in the range-velocity domain, so a signal processor of a radar device can accurately detect three targets.

However, in the multiple reception path environment as shown in FIG. 2, as shown in FIG. 4, one target T1 has the same (relative) speed, but it may be recognized that the lateral position of the target has a virtual position (dotted line) partially deviated from the actual position (solid line).

Accordingly, in the case of FIG. 4, it is difficult for the signal processor of the radar device to recognize whether the target T1 is a single target or multiple targets, and in particular, there may be a problem that it is not possible to accurately acquire a distance information and horizontal information (horizontal angle) of the target.

In order to solve the inaccuracy of the lateral information, it is required to improve the distance resolution, and for this, it is possible to increase the number of antennas of the radar device by hardware, or adjust the antenna separation distance, or increase the frequency bandwidth of the radar signal.

However, there are limitations to the hardware solution of the radar device due to an increase in cost and a space problem.

In addition, if the frequency bandwidth is increased, the distance resolution is improved, but there is a disadvantage in that the maximum detection distance is decreased.

Accordingly, in a specific condition such as a multiple reception path environment, there is a need for a method capable of securing the lateral position detection performance of the target without reducing other performance of the radar device.

Accordingly, the embodiments of the present disclosure may provide a technical manner capable of dynamically changing the horizontal detection performance of the radar by dynamically converting to one of a plurality of frequency band modes based on the detected distance of the target in the case that a specific driving condition is satisfied.

Figure 5:
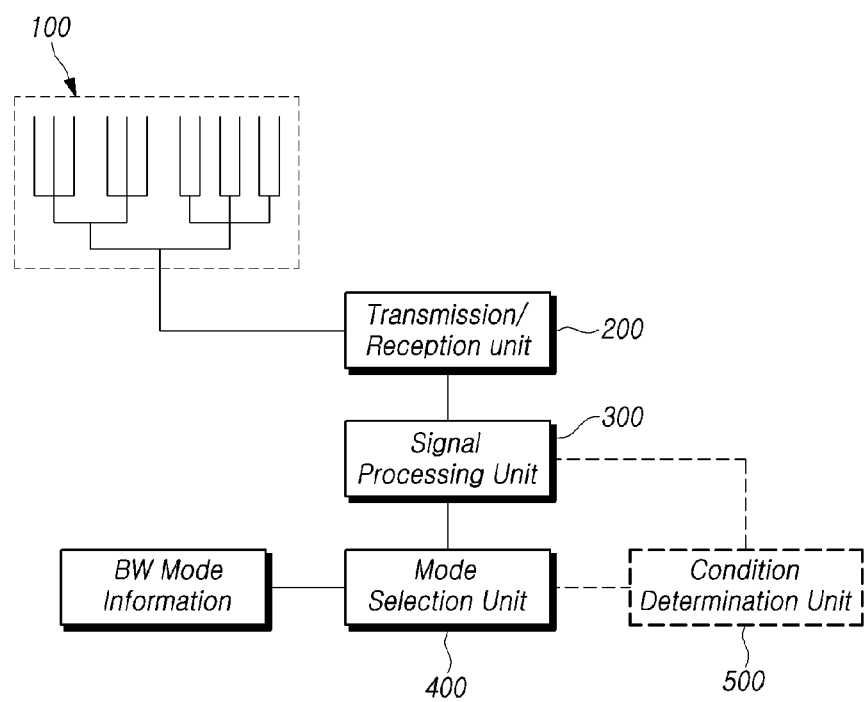
FIG. 5 illustrated a configuration of a vehicle radar device according to an embodiment of the present disclosure.

FIG. 5 illustrated a configuration of a vehicle radar device according to an embodiment of the present disclosure.

Referring to FIG. 5, a radar device according to an embodiment may include an antenna unit 100, a transmission/reception unit 200 for transmitting and receiving radar signals, a signal processing unit 300, and a mode selection unit 400. In this disclosure, the transmission/reception unit 200 may also be referred as a transceiver, the signal processing unit 300 may also be referred as a signal processor, and the mode selection unit 400 may also be referred as a mode selector.

In addition, the radar device according to an embodiment may further include a condition determination unit 500 for determining a condition in which the mode selection unit operates. In this disclosure, the condition determination unit 500 may also be referred as a condition determiner.

The antenna unit 100 may include a transmission antenna for transmitting a transmission signal around a vehicle and a receiving antenna for receiving a reception signal reflected from an object.

According to the present embodiment, one of the transmission antenna and the receiving antenna included in the antenna unit 100 may include two or more array antennas spaced apart (horizontal offset) by a predetermined distance in the horizontal direction.

More specifically, the antenna unit may include two or more transmission antennas separated by a predetermined distance in the horizontal direction and one or more receiving antennas arranged at the same position as the transmission antenna in the vertical direction.

Alternatively, the antenna unit may include may include one or more transmission antennas and two or more receiving antennas spaced apart by a predetermined distance in the horizontal direction.

A detailed configuration of the antenna unit used in the radar device according to the present embodiment will be described in more detail below with reference to FIG. 6.

Meanwhile, the transmission/reception unit 200 according to the present embodiment may be controlled to transmit the transmission signal in an operating frequency band according to one selection mode among a plurality of frequency band modes, and to receive the reception signal from the receiving antenna.

The signal processing unit 300 may control the transmission/reception unit 200 to transmit the transmission signal having a specific transmission beam pattern through the transmission antenna unit, and process the reception signal received from the receiving antenna to obtain object information.

The signal processing unit 300 may be expressed in other terms such as a control unit and a signal processor, and may be implemented in the form of a digital signal processor (DSP)

Meanwhile, the radar sensor device may be classified into a pulse type, a frequency modulation continuous wave (FMCW) type, and a frequency shift keying (FSK) type according to the signal type.

Among them, the FMCW type radar apparatus may use a chirp signal or a ramp signal, which is a signal whose frequency increases with time, and may determine the object's information by using time difference between the transmission wave and the reception wave and the doppler frequency shift.

More specifically, the controller of the radar device may include the signal transmission/reception unit 200 for controlling signal transmission/reception through a transmission/receiving antenna, and the signal processing unit 300 for calculating target information (position, distance, angle, etc.) by using the transmission signal and the reflected signal received from the receiving antenna.

The signal transmission/reception unit 200 may include the transmission unit 210 or the transmitter and the reception unit 220 or the receiver, and the transmission unit 210 may include an oscillator for supplying a signal to each transmission antenna to generate a transmission signal. The oscillator may include, for example, a voltage-controlled oscillator (VCO).

The reception unit 220 included in the signal transmission/reception unit 200 may include a low noise amplifier (LNA) for low-noise amplification of the reflection signal received through the receiving antenna, and a mixer for mixing the low-noise amplified reception signal, an amplifier for amplifying the mixed reception signal, and an analog digital converter (ADC) for generating reception data by digitally converting the amplified reception signal.

The signal processing unit 300 may include a first processing unit and a second processing unit. The first processing unit, as a pre-processor for the second processing unit, may acquire the transmission data and reception data, control the generation of the transmission signal in the oscillator based on the acquired transmission data, synchronize transmission data and reception data, and perform the frequency-conversion of the transmission data and reception data.

The second processing unit is a post-processor that performs actual processing using the processing result of the first processing unit. The second processing unit may perform a CFAR (Constant False Alarm Rate) calculations, tracking calculations, target selection calculations based on the received data frequency converted by the first processing unit so as to extract angle information, speed information, and distance information for a target. However, the present disclosure is not limited thereto, and if information on a target can be extracted, the technical idea according to the present disclosure may be applied.

The first processing unit may perform frequency conversion after data buffering the acquired transmission data and the acquired reception data in a unit sample size that can be processed per cycle. The frequency conversion performed by the above-described first processing unit may be implemented by using a Fourier transform such as a Fast Fourier Transform (FFT).

The second processing unit may perform a second Fourier transform on a first Fourier transform (FFT) signal performed by the first processing unit, and the second Fourier transform may be, for example, a Discrete Fourier Transform (DFT), in particular, a chirp-discrete Fourier transform (Chirp-DFT).

The second processing unit may acquire frequency values corresponding to the number of times corresponding to the second Fourier transform length K through the second Fourier transform such as Chirp-DFT. The second processing unit may detect an object by calculating the beat frequency with the greatest power during each chirp period based on the obtained frequency value, and obtaining speed information and distance information of the object based on the calculated beat frequency.

The principle of obtaining target information by the signal processing unit will be described in more detail below with reference to FIG. 7.

Figure 6:
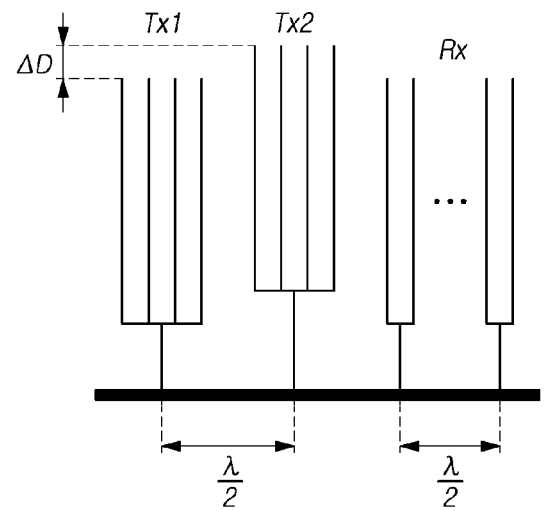
FIG. 6 illustrates an embodiment of an antenna unit included in the vehicle radar device according to an embodiment of the present disclosure.

FIG. 6 illustrates an embodiment of an antenna unit included in the vehicle radar device according to an embodiment of the present disclosure.

Referring to FIG. 6, the antenna unit 100 according to the present embodiment may include two transmission antennas Tx1, Tx2 and a plurality of receiving antennas Rx. The two transmission antennas Tx1 and Tx2 may be separated by a specific distance ΔD in the vertical direction, and a plurality of receiving antennas Rx may all have the same vertical position.

Each of the transmission antenna and the receiving antenna may have a structure in which 2, 4, or 6 array antennas extend to one direction while having one feed point, but is not limited thereto.

Each of the array antennas constituting the transmission antenna and receiving antennas may be composed of a plurality of elements or patches connected to the output line of the distributor, may extend in an upper direction (upper direction among the vertical directions) with a feed port connected to a chip including a controller or an input port of a distributor as a starting point.

In addition, the two transmission antennas Tx1 and Tx2 constituting the transmission antenna unit may be arranged to be spaced apart by a half of the transmission signal wavelength 0.5λ in the horizontal direction (second direction) perpendicular to the vertical direction (first direction), which is the extension direction of each array antenna. In addition, the plurality of receiving antennas Rx constituting the receiving antenna unit may also be arranged to be spaced apart by a half 0.5λ of the wavelength of the transmission signal.

In this way, by setting the horizontal distance between the transmission antenna or the receiving antenna as a half 0.5λ of the wavelength of the transmission signal, it is possible to remove the angle ambiguity caused by the grating lobe.

That is, the grating lobe may occur because the distance between the receiving antennas is more than half 0.5λ of the wavelength of the transmission signal. However, it is possible to minimize angle ambiguity due to the grating lobe by arranging the horizontal distance between the receiving antennas at 0.5λ, and comparing and compensating the angle information extracted from the channels of each receiving antenna.

In addition, as shown in FIG. 6, since the two transmission antennas Tx1 and Tx2 are vertically offset by a specific distance, there may be a phase difference due to the vertical offset between the first reception signal which is transmitted from Tx1 and received from the receiving antenna and the second reception signal which is transmitted from Tx2 and received from the receiving antenna.

Therefore, the target distance to the target can be calculated using the time difference between the transmission time and the reception time, and the horizontal information or the vertical information of the target may be acquired by using the phase difference between the transmission signal, the first reception signal, and the second reception signal.

The antenna 100 according to the present embodiment does not necessarily have the configuration as shown in FIG. 6, and may include one or more transmission antennas and two or more receiving antennas having the same vertical position.

However, in order to secure a wide range of adjustment of the distance resolution according to the mode selection according to the present embodiment, the number of transmission antennas and receiving antennas may be two or more, respectively, so that the maximum distance resolution can be increased.

In addition, the radar device according to the present embodiment may modulate a radar signal transmitted/received from a transmission antenna offset in a horizontal direction or a receiving antenna by using different modulation methods.

The mode selection unit 400 included in the radar device according to the present embodiment may dynamically determine a selection mode from one of a plurality of frequency band modes based on at least one of a target distance to a target obtained from the signal processing unit and the maximum detection distance for each frequency band.

More specifically, each frequency band mode included in the plurality of frequency band modes set according to the present embodiment may be defined by a unique operating frequency band and a maximum detection distance corresponding thereto.

In this case, the mode selection unit 400 according to the present embodiment may determine, as the selection mode, a frequency band mode having the largest operating frequency band among one or more frequency band modes having a maximum detection distance greater than the detected target distance.

That is, the mode selection unit 400 according to the present embodiment may dynamically determine one of a plurality of preset frequency band modes based on the distance of the target detected under a specific condition, and may scan the radar signal in an operating frequency band corresponding to the determined selection mode.

The operation of the mode selection unit will be described in more detail below with reference to FIG. 8.

In this case, the specific condition in which the mode selector operates may be a case in which multiple reception paths occur due to a soundproof wall, guard rail, and the like, as described with reference to FIGS. 2 to 4.

To this end, the radar device according to the present embodiment may further include a condition determination unit 500 for determining a condition in which the mode selection unit 400 operates.

The condition determination unit 500 may determine the driving condition of the vehicle based on the acquired stationary obstacle information around the vehicle, and may perform a function of activating the mode selection unit 400 in the case that a specific driving condition is satisfied.

In this case, the specific driving condition is a case where at least one of the guardrails, soundproof walls, tunnels, and overpasses exists around the vehicle, and the stationary obstacle information around the vehicle may be acquired from radar sensor information obtained by the signal processing unit 300 or other sensor information of an additional vehicle detection sensor.

In addition, information on a stationary obstacle existing on a road on which the vehicle travels may be obtained by receiving information on a road on which the vehicle travels using a communication module of the vehicle. For example, the communication module is for performing a communication between GPS satellite and vehicle, vehicle and vehicle, vehicle and infrastructure, vehicle and server, or vehicle internal communication, etc., and the communication module may acquire road information to the destination in real time based on the current location of the vehicle.

That is, the condition determination unit 500 uses the radar information obtained from the signal processing unit to detect an obstacle continuously existing in the longitudinal direction along the road, and may determine that the specific driving condition according to the present embodiment is satisfied.

In addition, the condition determination unit 500 processes front image data acquired through an image sensor such as a camera or a lidar and recognizes the existence of a stationary obstacle such as a soundproof wall and a guard rail in front. The condition determination unit 500 may, in that case, determine that the specific driving condition according to this embodiment is satisfied. In addition, in the case that the condition determination unit 500 recognizes a stationary obstacle using road information received through the communication module, the condition determination unit 500 may determine that the specific driving condition according to the present embodiment is satisfied.

More specifically, the condition determination unit 500 may use radar sensor information or other sensor information, and may recognize the stationary obstacle by using techniques such as an entropy-based approach, harmonics based approach, and machine learning-based approach.

Meanwhile, the signal processing unit 300 according to the present embodiment may acquire a range-velocity domain information of a target by applying a two-step Fast Fourier Transform (2-D FFT) to the reception signal.

Figure 7:
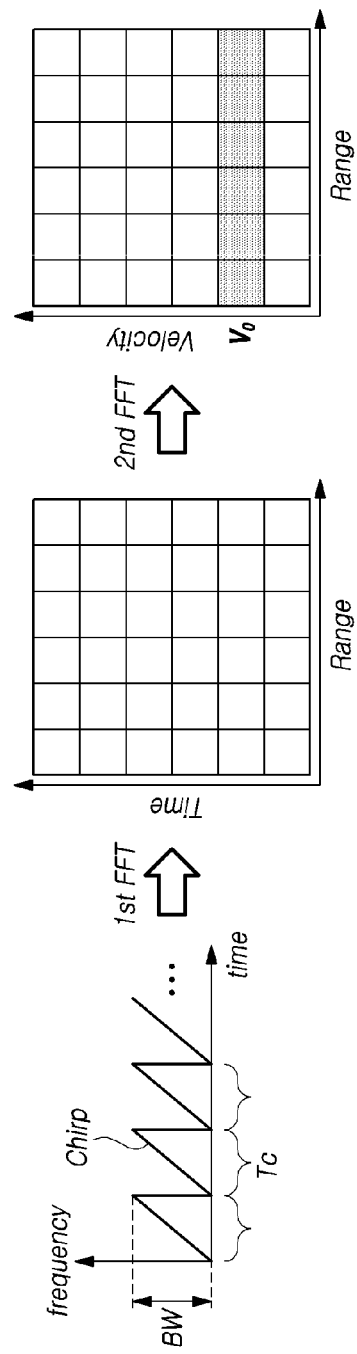
FIG. 7 illustrates a principle in which the signal processor of the radar device according to an embodiment acquires range-velocity information of a target.

FIG. 7 illustrates a principle in which the signal processor of the radar device according to an embodiment acquires range-velocity information of a target.

As shown in FIG. 7, the signal processing unit 300 according to the present embodiment may perform a first fourier transform (1st FFT) on the reception signal for a fast time to obtain a time component according to a distance, and perform a second fourier transform (2nd FFT) for a slow time and compress a signal existing at each distance according to a velocity to calculate a range-velocity information of the target.

More specifically, the signal processing unit 300, as shown on the left side of FIG. 7, may perform a first Fourier transform (1st FFT), which is a fast Fourier transform, on a radar reception signal including a fast ramp or a fast chirp to calculate a range-time graph, which is a time component according to a range.

Next, the signal processing unit 300 may perform a second Fourier transform on a range-time component, and may calculate a range-velocity graph representing speed information according to the distance as shown in the right side of FIG. 7.

The speed information according to the distance of an object existing around the vehicle may be obtained by using such a range-velocity information.

In this case, the identification distance difference $\Delta r$ related to the distance resolution and the identification speed difference $\Delta v$ related to the speed resolution may be defined by Equations 1 and 2 below.

$$\Delta r = \frac{c}{2BW} \quad \text{[Equation 1]}$$

In Equation 1, c denotes a speed of light, BW denotes a sweep bandwidth or a frequency band(width) of a radar signal, and $\Delta r$ denotes an identification distance difference.

The BW may mean the width of a frequency band occupied by one chirp signal.

The distance resolution or range resolution may be defined as an inverse number of the identification distance difference $\Delta r$.

That is, as the identification distance difference $\Delta r$ corresponding to a specific frequency bandwidth BW decreases, the distance resolution (range resolution) increases and it is possible to acquire a precise distance or horizontal position information.

$$\Delta v = \frac{c}{2LT_c f_c} \quad \text{[Equation 2]}$$

In Equation 2, c denotes the speed of light, L denotes the number of chirps (i.e., a signal whose frequency changes with time), Tc denotes the duration of the chirp, fc denotes the carrier frequency, and $\Delta v$ denotes identification speed difference.

The speed resolution may be defined as an inverse number of the identification speed difference $\Delta v$.

That is, as the identification speed difference $\Delta v$ decreases, the speed resolution increases and a precise target speed can be acquired.

Meanwhile, in the case that the speed or distance of each target is different in a situation where there are multiple moving targets in front, the signal component of each target may be separated on the two-dimensional range-velocity domain, as shown in FIG. 3.

However, if the speeds and distances of the multiple targets are the same or similar to each other, signal components of each target may be superimposed on one point in the two-dimensional range-velocity domain, as shown in FIG. 4.

In addition, as described with reference to FIG. 2, in a situation where there is a stationary obstacle such as a guard rail or a soundproof wall, there is a very high possibility that two signals are mixed and received from a single target. Even in this case, as shown in FIG. 4, a plurality of signal components may be superimposed on one point in the two-dimensional range-velocity domain.

Therefore, it is difficult to distinguish the two targets since there is a minute difference in the range-velocity information of the recognized target. In particular, if the angular difference value of the signal received through the two paths is lower than the angular resolution, the target may not be distinguished.

Therefore, in order to classify multiple targets or precisely detect a target in a multiple reception path environment, it is necessary to precisely separate a plurality of signal components in a range-velocity domain space.

Meanwhile, multiple targets may be separated through angle estimation. The angular resolution performance is related to the number of antennas and the antenna separation, however, the number of antennas and the antenna separation are difficult to increase due to hardware limitations.

In addition, it is also possible to improve the speed resolution for the separation of the target in the range-velocity domain.

However, as in Equation 2, since the identification speed difference $\Delta v$ is related to the duration of the chirp signal, so it is difficult to change the identification speed difference.

Therefore, in unfavorable driving conditions with stationary obstacles such as guardrails, soundproof walls, tunnels, etc., it is required to accurately distinguish targets by decreasing the identification distance difference $\Delta r$ or increasing the distance resolution $1/\Delta r$.

Meanwhile, the distance resolution or range resolution is related to the frequency bandwidth of the radar signal, that is, the sweep frequency bandwidth of the chirp signal, and if the bandwidth BW is increased, the distance resolution is improved according to Equation 1.

However, if the frequency bandwidth BW of the radar signal is increased, there may occur a problem in that the maximum detection distance rmax is decreased by Equation 3 below.

$$r_{max} = \frac{N_{fft}}{2} \cdot \Delta r = \frac{N_{fft}}{2} \cdot \frac{c}{2BW}$$ [Equation 3]

That is, if the frequency bandwidth BW is increased in order to improve the distance resolution ($1/\Delta r$), the maximum detection distance rmax is also decreased together with the identification distance difference $\Delta r$.

In other words, as the frequency bandwidth BW increases, the distance resolution increases, so that it is possible to detect precise horizontal position. However, since the maximum detection distance decreases, it is possible to only detect a target in a narrow detection area.

Accordingly, the radar device according to the present embodiment may set a plurality of frequency band modes divided by a radar frequency band value or a band range, and the mode selection unit 400 may determine one of a plurality of frequency band modes as a selection mode based on the detected target distance and the maximum detection distance.

Specifically, each frequency band mode is set by matching maximum detection distance information corresponding to a corresponding frequency band, and the mode selection unit 400 may determine a frequency band mode having the largest frequency band among the frequency band modes having a maximum detection distance greater than the distance to the detected target as the selection mode.

The radar device detects an object by using a radar signal in a frequency band corresponding to the determined selected mode during the next scan operation.

That is, when operating in the operating frequency band of the selection mode determined by the mode selection unit 400, the distance resolution for the object at the corresponding target distance may be maximized.

In the radar device according to the present embodiment, it is possible to optimize the distance resolution of the radar device by dynamically determining a frequency band mode linked with a maximum detection distance according to a distance to a target under a specific driving condition.

Figure 9:
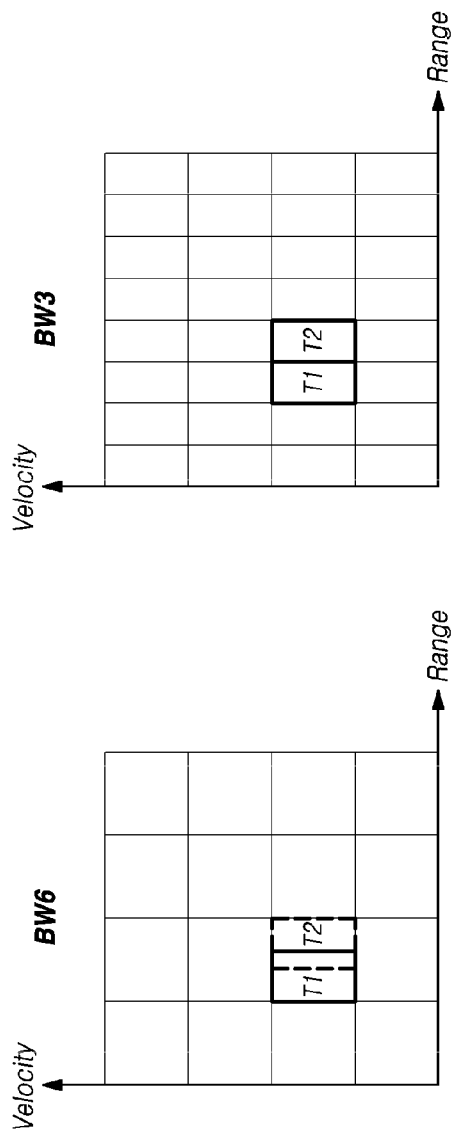
FIG. 9 illustrates a change in detection performance for a target according to dynamic mode changing according to an embodiment of the present disclosure.

FIG. 8 illustrates an example of a plurality of frequency band mode setting information according to an embodiment of the present disclosure, and FIG. 9 illustrates a change in detection performance for a target according to dynamic mode changing according to an embodiment of the present disclosure.

Referring to FIG. 8, in a radar device according to the present embodiment, a plurality of frequency band modes are set, and in each frequency band mode, a corresponding operating frequency bandwidth value BWi and an identification distance difference corresponding thereto ($\Delta$ ri or distance resolution) and the maximum detection distance ri,max are matched.

The frequency band mode information may be preset and stored in a memory or the like in the form of a lookup table.

In FIG. 8, it is illustrated that the frequency band mode information includes N modes, and in each mode i, a corresponding frequency bandwidth BWi (i=1, 2, . . . , N), the identification distance difference value $\Delta$ri and the maximum detection distance (ri,max) corresponding thereto are matched.

In this case, it is assumed that the lower the mode number i, the larger the frequency bandwidth BW.

That is, in the table of FIG. 8, BW1>BW2> . . . >BWN, and according to Equations 1 and 3 above, the relationship of r1,max<r2,max< . . . <rN,max may be established. Here, rN,max may be set based on a maximum detection distance that can be detected by the radar, which is the capability of the radar device.

That is, as the mode number i decreases, the distance resolution ($1/\Delta$ri) is also improved, but the maximum detection distance (ri,max) decreases.

In this state, the mode selection unit 400 may determine a frequency band mode having the largest operating frequency bandwidth BWi among one or more frequency band modes having a maximum detection distance (ri,max) greater than the target distance R of the detected target as the selection mode.

For example, if the distance R to the target is greater than the second maximum detection distance (r2,max) and smaller than the third maximum detection distance (r3,max), the mode selection unit 400 may determine the third mode having the third frequency bandwidth BW3 as the selection mode.

In a subsequent scan or operation cycle, the radar device performs target detection in the third frequency bandwidth BW3 of the determined third mode.

Therefore, the radar device can have a maximum distance resolution within a detection range capable of detecting a corresponding target, and accordingly, it is possible to precisely separate the target as described above or to accurately acquire the horizontal position information of the target.

In this case, the number N of frequency band modes and the frequency bandwidth BWi of each frequency band mode may be set in advance.

The left graph of FIG. 9 represents the range-velocity domain information of the target when operating in the sixth frequency bandwidth BW6 corresponding to the sixth mode, and the right graph represents the range-velocity domain information of the target when operating in the third frequency bandwidth BW3 corresponding to the third mode according to the above mode selection.

As shown in the left graph, as a result of recognizing a target in the sixth frequency bandwidth BW6 having a relatively small bandwidth, the distance resolution is low, so that the first target T1 and the second target T2 may be overlapped and mapped in the range-velocity domain region, thereby make it difficult to separate the targets.

However, according to the mode selection according to the present embodiment, as a result of recognizing the target in the third frequency bandwidth BW3 having a large bandwidth, as shown in the right graph, the distance resolution may increase, so that the first target T1 and the second target T2 can be recognized separately in the range-velocity domain region.

To this end, the transmission/reception unit 200 according to the present embodiment may receive information on the selection mode from the mode selection unit 400, and transmit a transmission signal in an operating frequency band corresponding to the selection mode in the subsequent scan operation.

In addition, the signal processing unit 300 of the radar device according to the present embodiment may determine whether the target is a single target or a multiple target based on the range-velocity information calculated according to the selection mode.

Meanwhile, the transmission/reception unit 200, the signal processing unit 300, the mode selection unit 400, and the condition determination unit 500 included in the radar device according to the present embodiment as described above may be implemented as a module in a radar control device for a vehicle or an ECU.

Such a radar control device or ECU may include a processor, a storage device such as a memory, and a computer program capable of performing a specific function. In addition the above-described transmission/reception unit 200, signal processing unit 300, mode selection unit 400 and the condition determination unit 500 may be implemented as software modules capable of performing respective corresponding functions.

That is, the transmission/reception unit 200, the signal processing unit 300, the mode selection unit 400, and the condition determination unit 500 according to the present embodiment may be implemented as corresponding software modules and stored in a memory. In addition, each software module can be executed in a processing unit such as an ECU at a specific timing.

Figure 10:
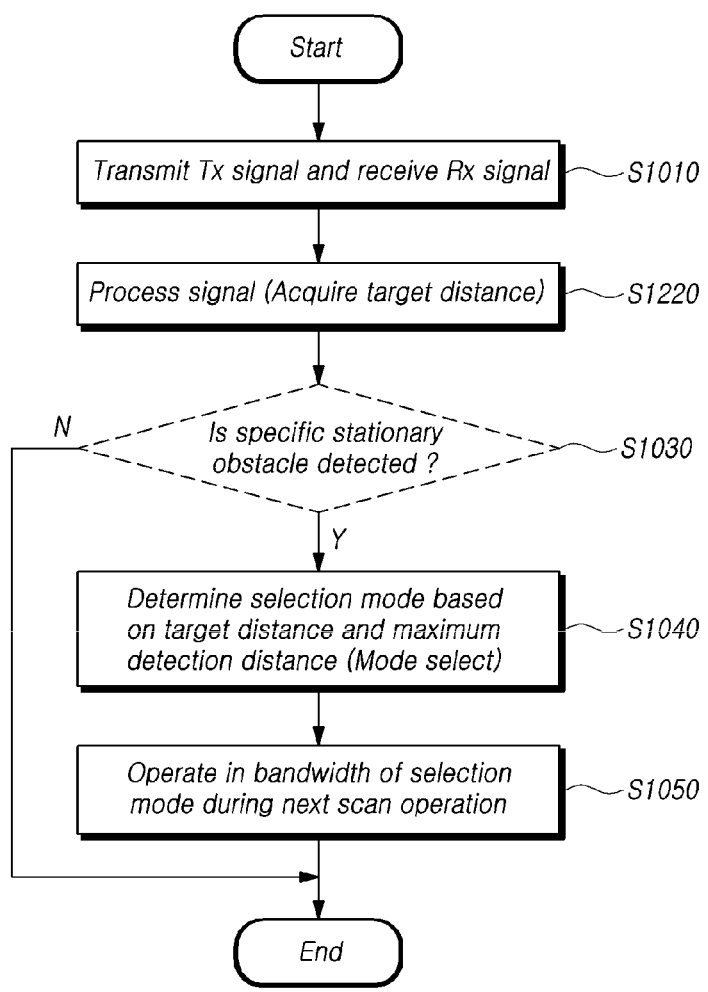
FIG. 10 is a flowchart illustrating the overall flow of a controlling method of the radar device according to an embodiment of the present disclosure.

FIG. 10 is a flowchart illustrating the overall flow of a controlling method of the radar device according to an embodiment of the present disclosure.

Referring to FIG. 10, a controlling method of the radar device according to an embodiment may include transmitting a transmission signal in an operating frequency band according to a selection mode among a plurality of frequency band modes through a transmission antenna and receiving a reception signal reflected from an object by a receiving antenna (S1010), processing the reception signal received from the receiving antenna to acquire a target information (S1020), dynamically determining the selection mode from one of the plurality of frequency band modes as based on at least one of a target distance to a target acquired in the processing the reception signal and a maximum detection distance for each frequency band (S1040), and transmitting the transmission signal in the operating frequency band corresponding to the selection mode during a subsequent scan operation (S1050).

In addition, a controlling method of the radar device according to an embodiment may further include determining a driving condition of the vehicle based on obtained information on a stationary obstacle around the vehicle, and performing the dynamically determining of the selection mode if the driving condition of the vehicle corresponds to a specific driving condition (S1030).

In this case, the specific driving condition may include a condition in which at least one of the guardrails, soundproof walls, tunnels, and overpasses exist around the vehicle. Information on the a stationary obstacle around the vehicle may be acquired from target information obtained from the signal processor or from other sensor information obtained from an additional vehicle detection sensor.

In addition, in step S1050, each frequency band mode included in the plurality of frequency band modes may be defined by a unique operating frequency band and the maximum detection distance corresponding thereto. In the dynamically determining the selection mode, the selection mode may be determined by a frequency band mode having the largest operating frequency band among one or more frequency band modes which have the maximum detection distance greater than the target distance.

In the case that it is assumed that the frequency band information is set as shown in FIG. 8, the determining of the selection mode S1050 may be performed with the following algorithm (software source code).

```
for n = 1:N
    if r_CIPV*1.2<r_n,max
        Select mode 'n'
        break
    end if
end for
```

According to the above algorithm, the mode number is increased by 1 from 1, and the value obtained by multiplying the distance to the target $r_{CIPV}$ by a specific gain of 1.2 is compared with the maximum detection distance $r_{n,max}$ in the corresponding mode, and if the maximum detection distance $r_{n,max}$ is greater than the value obtained by multiplying the distance to the target $r_{CIPV}$ and the gain, the corresponding mode is selected as the selection mode.

In this case, the gain is for setting an allowable range to ensure target detection, and it is described that the gain is 1.2 in the above algorithm, however is not limited thereto, and any value greater than 1.0 may be possible.

Figure 11:
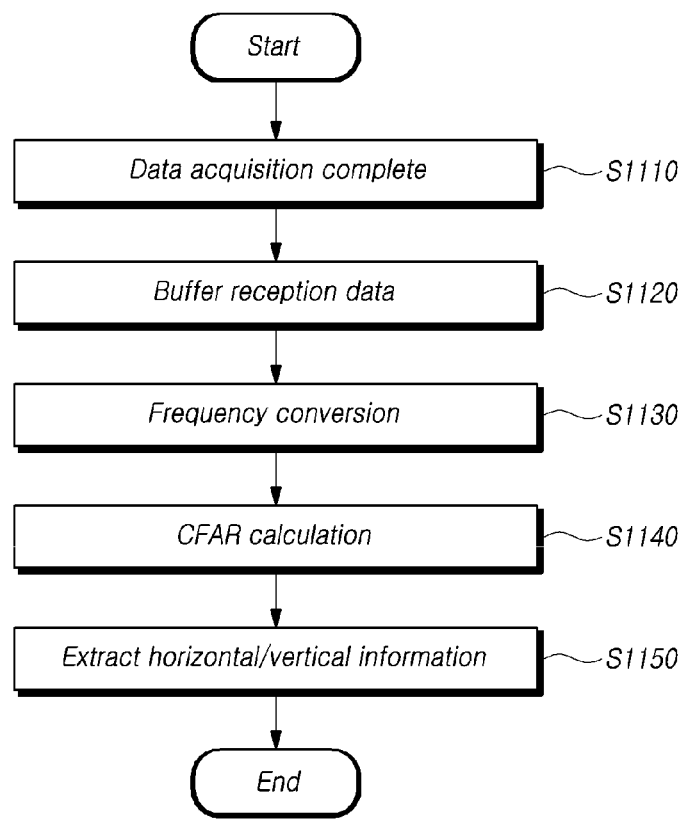
FIG. 11 is a flowchart of a signal processing method provided by the radar device according to an embodiment of the present disclosure.

FIG. 11 is a flowchart of a signal processing method provided by the radar device according to an embodiment of the present disclosure.

FIG. 11 is a flowchart illustrating a signal processing process after receiving the reflection signal from the target is completed. The radar device may buffer the reception data obtained in the data acquisition completion step (S1110) in a unit sample size that can be processed per cycle (S1120), and then performs frequency conversion (S1130).

Thereafter, CFAR (Constant False Alarm Rate) calculation (S1140) is performed based on the frequency-converted reception data, and vertical/horizontal information, speed information, and distance information for the target are extracted (S1150). The frequency conversion in the frequency conversion step S1230 may use a Fourier transform such as a Fast Fourier Transform (FFT).

Figure 12:
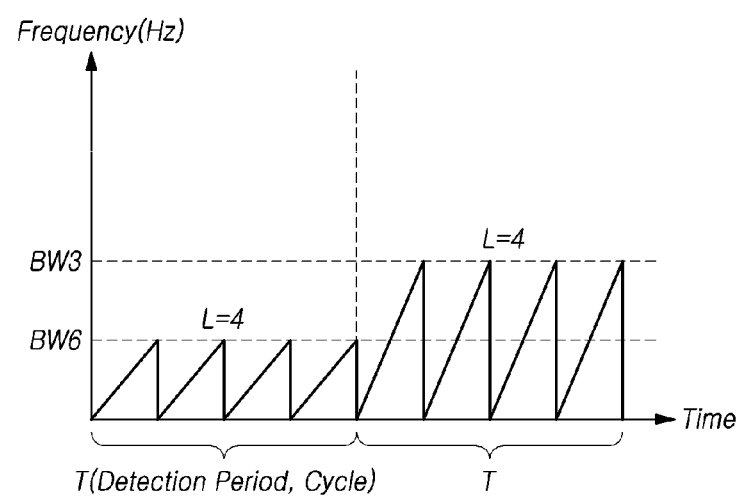
FIG. 12 illustrates differences in signal waveforms and frequency bands in the case that a radar device according to an embodiment of the present disclosure is converted from the first mode to the second mode.

FIG. 12 illustrates differences in signal waveforms and frequency bands in the case that a radar device according to an embodiment of the present disclosure is converted from the first mode to the second mode.

As in the above-described embodiment, it is assumed that the radar device operates in the sixth frequency bandwidth BW6 corresponding to the sixth mode, and then operates in the third frequency bandwidth BW3 corresponding to the third mode by the mode selection operation according to the present embodiment.

As shown in FIG. 12, the first transmission signal in the sixth mode before the mode change is transmitted in the sixth frequency bandwidth BW6, and the second transmission signal after the mode change to the third mode is transmitted in the third frequency bandwidth BW3 which has a frequency band twice as large as BW6.

In this case, it is assumed that the number L of chirp signals included in one detection period T before and after the mode change, that is, the chirp duration is maintained in the same (L=4).

However, in order to improve the angular resolution, it is also possible to change the number L of chirp signals included in one detection period T before and after the mode change.

For example, in the sixth mode before the mode change, a so-called slow chirp transmission signal having a large width of a waveform may be used.

Meanwhile, in the third mode after the mode change, a so-called fast chirp transmission signal having a small width of a waveform may be used.

Therefore, the first number of signal waveforms (i.e., chirps) included in one detection period T or the cycle in the sixth mode before the mode change may be smaller than the second number of signal waveforms included in one detection period T in the third mode after the mode change.

Meanwhile, some of the sixth frequency bandwidth before mode change and the third frequency bandwidth after mode change may be partially overlapped or may be completely different from each other.

In general, a fast-chirp method in which a plurality of signal waveforms are transmitted in one detection cycle may increase the amount of the transmission data, but may improve the detection performance, and in particular, may secure a desired degree of resolution with a low output.

As described above, according to the present embodiment, by dynamically varying the frequency bandwidth linked to the maximum detection distance according to the distance to the target under specific driving conditions, it is possible to dynamically optimize the distance resolution of the radar device.

The antenna unit used in the radar device according to the present embodiment is not limited to the configuration as described above.

That is, it may be used another structure in which the antenna unit according to the present embodiment includes one or more transmission antennas for transmitting the transmission signal and one or more receiving antennas for receiving the reception signal reflected from the target.

In addition, the radar device according to the present embodiments can employ a signal transmission and reception technique based on a multidimensional antenna array and a multiple input multiple output (MIMO) in order to form a virtual antenna aperture greater than an actual antenna aperture.

For example, a two-dimensional antenna array can be employed to accomplish the accuracy of an angle to the vertical and/or the horizontal and a higher resolution. In case the two-dimensional radar antenna array is used, signals are transmitted and received by two separate scans (time multiplexed) horizontally and vertically, and the MIMO can be used separately from the horizontal and vertical scans (time multiplexed) by the two-dimensional antenna array.

More specifically, the radar device according to one or more embodiments can comprise a two-dimensional antenna array including a transmission antenna assembly including a total of 12 transmission antennas Tx and a receiving antenna assembly including a total of 16 receiving antennas Rx; as a result, a total of 192 virtual receiving antennas can be arranged.

Further, in another embodiment, in a case where the antenna assembly of the radar sensor comprises the two-dimensional antenna array, each antenna patch can be disposed in a diamond or rhombus shape; therefore, unnecessary side lobes can be reduced.

Alternatively, the two-dimensional antenna arrangement can comprise a V-shape antenna array in which a plurality of radiating patches is arranged in a V-shape, and more specifically, comprise two V-shape antenna arrays. In this case, a single feed is performed to the apex of each V-shape antenna array.

Alternatively, the two-dimensional antenna arrangement can comprise a X-shape antenna array in which a plurality of radiating patches is arranged in a X-shape, and more specifically, comprise two X-shape antenna arrays. In this case, a single feed is performed to the center of each X-shape antenna array.

Further, the radar device according to one or more embodiments can employ the MIMO antenna system to accomplish the accuracy of an angle to the vertical and/or the horizontal and a higher resolution.

More specifically, in the MIMO system, each transmission antenna can transmit a signal with a waveform independent of one another. That is, each transmission antenna can transmit a signal with a waveform independent of the other transmission antenna(s), and then each receiving antenna can determine which transmission antenna a received signal from an object is transmitted from due to the using of the independent waveform for each transmission antenna.

Further, the radar device according to one or more embodiments can comprise a radar housing in which a substrate on which the antenna assembly is disposed and a circuitry are accommodated, and a radome served as an enclosure of the radar housing. The radome can be formed of a material capable of decreasing attenuation of radar signals transmitted and received, and constitute a front or rear bumper, a grille, or a side body of the vehicle, or an exterior surface of one or more components of the vehicle.

That is, the radome of the radar device can be disposed inside of the bumper, the grille, or the body of the vehicle, or be disposed as a part of a component constituting the exterior surface of the vehicle, such as a part of the bumper, the grille, or the body of the vehicle. Therefore, the radome can improve the aesthetics of the vehicle and provide the convenience of mounting the radar sensor.

The radar sensor or the radar device/system according to the present disclosure can comprise one or more of a front detection radar sensor mounted in the front of the vehicle, a rear detection radar sensor mounted in the rear of the vehicle, and a side or side-rear detection radar sensor mounted in a side of the vehicle, which can constitute at least one radar sensor subsystem.

The radar sensor or the radar device/system can process data by analyzing a transmitting signal and a reception signal, and as a result, extract information on an object. To do this, the radar sensor or the radar sensor apparatus/system can comprise an electronic or controlling circuitry ECU, or a processor. Data transmission or signal communication from the radar sensor to the electronic or control circuitry ECU or the processor can use a communication link, such as a vehicle network bus, or the like.

Figure 13:
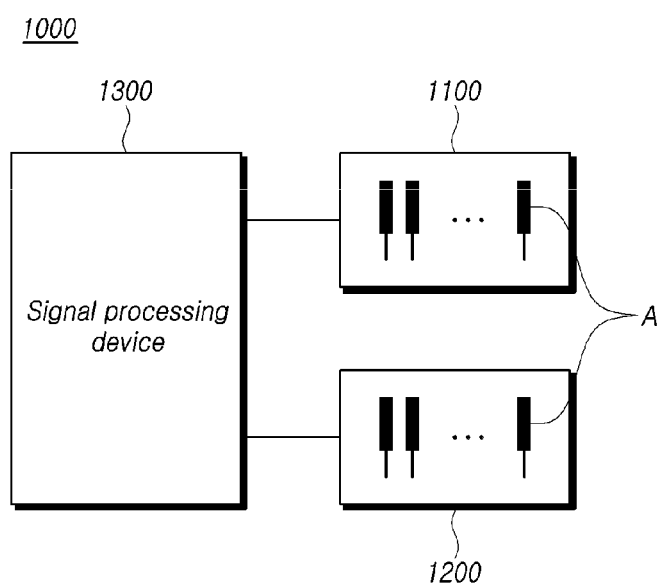
FIG. 13 illustrated a configuration of a vehicle radar system according to an embodiment of the present disclosure.

FIG. 13 illustrated a configuration of a vehicle radar system according to an embodiment of the present disclosure. Referring to FIG. 13, a radar system 1000 according to an embodiment may include a transmission antenna 1100 for transmitting a transmission signal in an operating frequency band according to a selection mode among a plurality of frequency band modes, a receiving antenna 1200 for receiving a reception signal reflected from a target, and Signal processing device 1300 that processes the reception signal received from the receiving antenna to acquire a target information, and dynamically determines the selection mode from one of the plurality of frequency band modes as based on at least one of a target distance to a target acquired in the processing the reception signal and a maximum detection distance for each frequency band, and transmits the transmission signal in an operating frequency band corresponding to the selection mode during a subsequent scan operation.

A transmission antenna 1100 and a receiving antenna 1200 are constituted of a plurality of antennas.

Specifically, a transmission antenna 1100 and a receiving antenna 1200 may be constituted of a plurality of transmission antenna units for transmitting signals and a plurality of reception antenna units for receiving signals reflected from objects. At this time, a transmission antenna 1100 and a receiving antenna 1200 may be constituted of a plurality of antennas A arranged in a one-dimensional or two-dimensional array, respectively, and each antenna A may have a different directivity angle.

In addition, the transmission antenna 1100 may be divided into a short range antenna for sensing a short range according to a sensing region and a long range antenna for sensing a long range. The receiving antenna 1200 may receive a signal without dividing the sensing region.

Signal processing device 1300 controls signal transmission and reception of the transmission antenna 1100 and the receiving antenna 1200 Signal processing device 1300 may control a signal transmitted from the transmission antenna 1100 and may analyze a signal received at the receiving antenna 1200 to calculate a distance to an object. In addition, the signal processing device 1300 may control a signal transmitted from the transmission antenna 1100, or may adjust an object detection region through selection of an antenna that transmits a signal. In this transmission and reception of signals, beamforming technique can be applied.

In addition, the signal processing device 1300 may determine a driving condition of the vehicle based on obtained information on a stationary obstacles around the vehicle, and may activate the dynamically determining of the selection mode if the driving condition of the vehicle corresponds to a specific driving condition. In addition, the signal processing device 1300 may determine, as the selection mode, a frequency band mode having the largest operating frequency band among one or more frequency band modes which have the maximum detection distance greater than the target distance. each frequency band mode included in the plurality of frequency band modes is defined by a unique operating frequency band and the maximum detection distance corresponding thereto.

As described above, according to an embodiment of the present disclosure, if a specific driving condition is satisfied, the horizontal detection performance of the radar device may be dynamically changed by dynamically determining one of a plurality of frequency band modes based on the detected distance to the target.

It should be noted that although all or some of the configurations or elements included in one or more of the embodiments described above have been combined to constitute a single configuration or component or operated in combination, the present disclosure is not necessarily limited thereto. That is, within the scope of the object or spirit of the present disclosure, all or some of the configurations or elements included in the one or more of the embodiments may be combined to constitute one or more configurations or components or operated in such combined configuration(s) or component(s). Further, each of the configurations or elements included in one or more of the embodiments may be implemented by an independent hardware configuration; however, some or all of the configurations or elements may be selectively combined and implemented by one or more computer program(s) having one or more program module (s) that perform some or all functions from one or more combined hardware configuration(s). Codes or code segments constituting the computer program(s) may be easily produced by those skilled in the art. As the computer programs stored in computer-readable media are read and executed by a computer, embodiments of the present disclosure can be implemented. The media for storing computer programs may include, for example, a magnetic storing medium, an optical recording medium, and a carrier wave medium.

Further, unless otherwise specified herein, terms 'include', 'comprise', 'constitute', 'have', and the like described herein mean that one or more other configurations or elements may be further included in a corresponding configuration or element. Unless otherwise defined herein, all the terms used herein including technical and scientific terms have the same meaning as those understood by those skilled in the art. The terms generally used such as those defined in dictionaries should be construed as being the same as the meanings in the context of the related art and should not be construed as being ideal or excessively formal meanings, unless otherwise defined herein.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A radar device for a vehicle comprising:
an antenna unit including a transmission antenna for transmitting a transmission signal around the vehicle and a receiving antenna for receiving a reception signal reflected from a target;
a transceiver being controlled to transmit the transmission signal in an operating frequency band according to a selection mode among a plurality of frequency band modes through the transmission antenna, and to receive the reception signal through the receiving antenna;
a signal processor processing the reception signal received from the receiving antenna to acquire target information; and,
a mode selector dynamically determining one of the plurality of frequency band modes as the selection mode based on at least one of a target distance to the target acquired from the signal processor and a maximum detection distance for each frequency band,
wherein each frequency band mode included in the plurality of frequency band modes is defined by a unique operating frequency band and the maximum detection distance corresponding thereto,
wherein the mode selector determines, as the selection mode, a frequency band mode having the largest operating frequency band among one or more frequency band modes which have the maximum detection distance greater than the target distance, and
wherein the mode selector compares a value obtained by multiplying the target distance by a preset gain and the maximum detection distance, and determines the frequency band mode in which the maximum detection distance increases as the selection mode.

2. The radar device for the vehicle of claim 1, further comprising a condition determiner determining a driving condition of the vehicle based on obtained information on a stationary obstacle obstacles around the vehicle, and activating the mode selector if the driving condition of the vehicle corresponds to a specific driving condition.

3. The radar device for the vehicle of claim 2, wherein the specific driving condition includes a condition in which at least one of a guardrail, a soundproof wall, a tunnel, and an overpass exists around the vehicle.

4. The radar device for the vehicle of claim 1, wherein the signal processor performs a first Fourier transform (1st FFT) on the reception signal for a fast time to obtain a time component according to a distance, and performs a second Fourier transform (2nd FFT) for a slow time and compresses a signal existing at each distance according to a velocity to calculate a range-velocity information of the target.

5. The radar device for the vehicle of claim 4, wherein the signal processor determines whether the target is a single target or a multiple target based on the range-velocity information calculated according to the selection mode.

6. The radar device for the vehicle of claim 1, wherein the transceiver receives information on the selection mode from the mode selector, and transmits a transmission signal in the operating frequency band corresponding to the selection mode during a subsequent scan operation.

7. The radar device for the vehicle of claim 1, wherein a distance resolution of an object at the target distance is maximized according to the operating frequency band of the selection mode determined by the mode selector.

8. A controlling method of a vehicle radar device comprising:
transmitting a transmission signal in an operating frequency band according to a selection mode among a plurality of frequency band modes through a transmission antenna and receiving a reception signal reflected from an object by a receiving antenna;
processing the reception signal received from the receiving antenna to acquire a target information;
dynamically determining the selection mode from one of the plurality of frequency band modes as based on at least one of a target distance to a target acquired in the processing the reception signal and a maximum detection distance for each frequency band; and
transmitting the transmission signal in the operating frequency band corresponding to the selection mode during a subsequent scan operation,
wherein each frequency band mode included in the plurality of frequency band modes is defined by a unique operating frequency band and the maximum detection distance corresponding thereto,
wherein the dynamically determining the selection mode comprises determining, as the selection mode, a frequency band mode having the largest operating frequency band among one or more frequency band modes which have the maximum detection distance greater than the target distance, and
wherein the dynamically determining the selection mode comparing a value obtained by multiplying the target distance by a preset gain and the maximum detection distance, and determining the frequency band mode in which the maximum detection distance increases as the selection mode.

9. The controlling method of claim 8, further comprising determining a driving condition of the vehicle based on obtained information on a stationary obstacle around the vehicle, and activating the dynamically determining of the selection mode if the driving condition of the vehicle corresponds to a specific driving condition.

10. The controlling method of claim 9, wherein the specific driving condition includes a condition in which at least one of a guardrail, a soundproof wall, a tunnel, and an overpass exists around the vehicle.

11. The controlling method of claim 8, wherein the processing of the reception signal comprises performing a first Fourier transform (1st FFT) on the reception signal for a fast time to obtain a time component according to a distance, and performing a second Fourier transform (2nd FFT) for a slow time and compressing a signal existing at each distance according to a velocity to calculate a range-velocity information of the target.

12. The controlling method of claim 11, wherein the processing of the reception signal comprises determining whether the target is a single target or a multiple target based on the range-velocity information calculated according to the selection mode.

13. The controlling method of claim 8, wherein a distance resolution of an object at the target distance is maximized according to the operating frequency band of the selection mode determined in the dynamically determining the selection mode.

14. A radar system for a vehicle comprising:
a transmission antenna for transmitting a transmission signal in an operating frequency band according to a selection mode among a plurality of frequency band modes;

a receiving antenna for receiving a reception signal reflected from a target; and, a Signal processing device that processes the reception signal received from the receiving antenna to acquire a target information, and dynamically determines the selection mode from one of the plurality of frequency band modes as based on at least one of a target distance to a target acquired in the processing the reception signal and a maximum detection distance for each frequency band, and transmits the transmission signal in an operating frequency band corresponding to the selection mode during a subsequent scan operation, wherein each frequency band mode included in the plurality of frequency band modes is defined by a unique operating frequency band and the maximum detection distance corresponding thereto, wherein the signal processing device determines, as the selection mode, a frequency band mode having the largest operating frequency band among one or more frequency band modes which have the maximum detection distance greater than the target distance, and wherein the signal processing device compares a value obtained by multiplying the target distance by a preset gain and the maximum detection distance, and determines the frequency band mode in which the maximum detection distance increases as the selection mode.

15. The radar system for a vehicle of claim 14, wherein the signal processing device determines a driving condition of the vehicle based on obtained information on a stationary obstacle around the vehicle, and activates the dynamically determining of the selection mode if the driving condition of the vehicle corresponds to a specific driving condition.

\* \* \* \* \*